United States Patent
Ogawa

(10) Patent No.: US 10,511,761 B2
(45) Date of Patent: Dec. 17, 2019

(54) IMAGE CAPTURING CONTROL APPARATUS, CONTROL METHOD, AND STORAGE MEDIUM

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 16/018,545

(22) Filed: Jun. 26, 2018

(65) Prior Publication Data

US 2019/0004400 A1  Jan. 3, 2019

(30) Foreign Application Priority Data

Jun. 29, 2017 (JP) .................................. 2017-127829

(51) Int. Cl.

| H04N 5/232 | (2006.01) |
|---|---|
| G03B 13/36 | (2006.01) |
| G02B 7/09 | (2006.01) |
| G01S 3/00 | (2006.01) |

(52) U.S. Cl.
CPC ......... *H04N 5/232127* (2018.08); *G01S 3/00* (2013.01); *G02B 7/09* (2013.01); *G03B 13/36* (2013.01); *H04N 5/232* (2013.01); *H04N 5/23212* (2013.01); *H04N 5/23219* (2013.01); *H04N 5/23245* (2013.01); *H04N 5/232945* (2018.08)

(58) Field of Classification Search
None
See application file for complete search history.

(56) References Cited

U.S. PATENT DOCUMENTS

| 9,304,183 B2 * | 4/2016 | Sasaki ..................... G02B 7/28 |
|---|---|---|
| 2017/0064188 A1 * | 3/2017 | Yoshida ............ H04N 5/23212 |

FOREIGN PATENT DOCUMENTS

JP 2010-141767 A 6/2010

* cited by examiner

*Primary Examiner* — Mark T Monk
(74) *Attorney, Agent, or Firm* — Cowan, Liebowitz & Latman, P.C.

(57) ABSTRACT

There is provided an image capturing control apparatus. An AF control unit performs AF control within an area included in a captured area and corresponding to an AF mode, to perform control to determine an in-focus area. After the in-focus area is determined, an display control unit performs control to: if the AF mode is a first AF mode in which the in-focus area is automatically determined within a first area included in the captured area, magnify an LV image with reference to the in-focus area; and if the AF mode is a second AF mode in which the in-focus area is automatically determined within a second area that is smaller than the first area, magnify the LV image with reference to a predetermined position in the second area.

14 Claims, 9 Drawing Sheets

IMAGE CAPTURING CONTROL APPARATUS, CONTROL METHOD, AND STORAGE MEDIUM

BACKGROUND OF THE INVENTION

Field of the Invention

The present invention relates to an image capturing control apparatus, a control method, and a storage medium.

Description of the Related Art

Regarding digital cameras, the function of allowing a user to perform additional focus adjustment using manual focusing (MF), after autofocusing (AF) has been performed to bring the subject into focus, is known. When a user performs an MF operation, if a position that the user wishes to bring into focus in a live-view image (an LV image) is displayed in a magnified view, the user can more easily perform focus adjustment, which is convenient for the user. However, it is troublesome for a user to adjust the position to be magnified while performing an MF operation.

To solve this problem, Japanese Patent Laid-Open No. 2010-141767, for example, proposes technology according to which, upon an MF operation being performed after an image capturing apparatus has automatically determined an AF in-focus area, the image capturing apparatus determines the position to be magnified in an image, based on the in-focus area. With this technology, the user can easily display a magnified view of the in-focus position in an image, and can easily check the image and perform focus adjustment.

As one AF mode, there is a mode (hereinafter, "zone AF") for automatically determining an in-focus area within an area (hereinafter, "a zone frame") that is included in the captured area. However, zone AF is not taken into account in Japanese Patent Laid-Open No. 2010-141767.

Typically, in the zone AF mode, the user can specify, as a zoom frame, any partial area in the area on which the image capturing apparatus can perform AF control. Therefore, it is envisaged that the user often specifies a zone frame such that the subject that the user wishes to ultimately bring into focus is located at the center of the zone frame. However, when determining the in-focus area within the zone frame, the image capturing apparatus does not necessarily determine the center of the zone frame as the in-focus area. Therefore, in a case where an MF operation is performed after the in-focus area has been determined using zone AF, if the position to be magnified in the image is determined based on the in-focus area as shown in Japanese Patent Laid-Open No. 2010-141767, there is the possibility of a position that is not intended by the user being magnified.

SUMMARY OF THE INVENTION

The present invention has been made in view of such a situation, and provides technology for increasing the likelihood that, in a case where an LV image is magnified after an in-focus area has been determined through AF control, the magnified position will meet the user's intention.

According to a first aspect of the present invention, there is provided an image capturing control apparatus comprising a memory and at least one processor which function as: a mode setting unit configured to set one of a plurality of autofocus modes (AF modes); a display control unit configured to perform control to display a live-view image (an LV image); and an AF control unit configured to perform AF control within an area that is included in a captured area and corresponds to the AF mode set by the mode setting unit, to perform control to determine an in-focus area, wherein, after the in-focus area is determined, the display control unit performs control to: if the AF mode set by the mode setting unit is a first AF mode in which the in-focus area is automatically determined within a first area included in the captured area, magnify the LV image with reference to the in-focus area and if the AF mode set by the mode setting unit is a second AF mode in which the in-focus area is automatically determined within a second area that is smaller than the first area, magnify the LV image with reference to a predetermined position in the second area, regardless of the in-focus area.

According to a second aspect of the present invention, there is provided a control method executed by an image capturing control apparatus, comprising: setting one of a plurality of autofocus modes (AF modes); performing control to display a live-view image (an LV image); performing AF control within an area that is included in a captured area and corresponds to the AF mode set in the setting, to perform control to determine an in-focus area; and after the in-focus area is determined, performing control to: if the AF mode set in the setting is a first AF mode in which the in-focus area is automatically determined within a first area included in the captured area, magnify the LV image with reference to the in-focus area and if the AF mode set in the setting is a second AF mode in which the in-focus area is automatically determined within a second area that is smaller than the first area, magnify the LV image with reference to a predetermined position in the second area, regardless of the in-focus area.

According to a third aspect of the present invention, there is provided a non-transitory computer-readable storage medium which stores a program for causing a computer to execute a control method comprising: setting one of a plurality of autofocus modes (AF modes); performing control to display a live-view image (an LV image); performing AF control within an area that is included in a captured area and corresponds to the AF mode set in the setting, to perform control to determine an in-focus area; and after the in-focus area is determined, performing control to: if the AF mode set in the setting is a first AF mode in which the in-focus area is automatically determined within a first area included in the captured area, magnify the LV image with reference to the in-focus area; and if the AF mode set in the setting is a second AF mode in which the in-focus area is automatically determined within a second area that is smaller than the first area, magnify the LV image with reference to a predetermined position in the second area, regardless of the in-focus area.

Further features of the present invention will become apparent from the following description of exemplary embodiments with reference to the attached drawings.

BRIEF DESCRIPTION OF THE DRAWINGS

FIGS. 3B-1 and 3B-2 are flowcharts for image shooting mode processing that is performed by the digital camera 100.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 1:
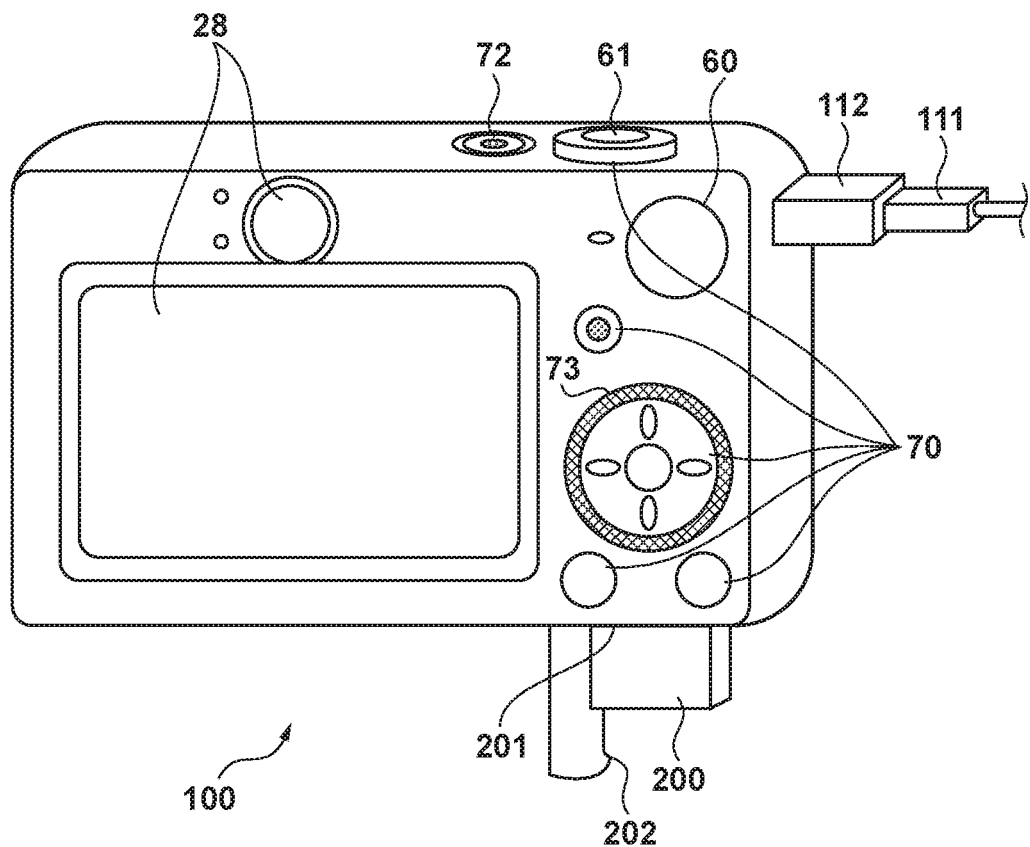
FIG. 1 is a diagram showing an external appearance of a digital camera 100.

FIG. 1 is a diagram showing an external appearance of a digital camera 100, which is an example of an image capturing control apparatus. A display unit 28 is a display unit that displays images and various kinds of information. The display unit 28 includes a rear display panel, and an electronic viewfinder, which is a display unit in the viewfinder. A shutter button 61 is an operation unit that is used to provide an image shooting instruction. A mode change switch 60 is an operation unit that is used to switch to various modes. A connector 112 is a connector that connects a connection cable 111, which is used for connection to an external apparatus such as a personal computer or a printer, and the digital camera 100 to each other. An operation unit 70 is an operation unit that includes operation members such as various switches, buttons, and a touch panel that are used to accept various operations from a user. A controller wheel 73 is an operation member that is included in the operation unit 70 and accepts a rotational operation. A power switch 72 is a push button that is used for switching power ON and power OFF. A recording medium 200 is a recording medium such as a memory card or a hard disk. A recording medium slot 201 is a slot for housing the recording medium 200. The recording medium 200 housed in the recording medium slot 201 can communicate with the digital camera 100, and realize recording and playback. A cover 202 is a cover for the recording medium slot 201. FIG. 1 shows a state in which the cover 202 is open and the recording medium 200 is partially taken out and exposed from the recording medium slot 201.

Figure 2:
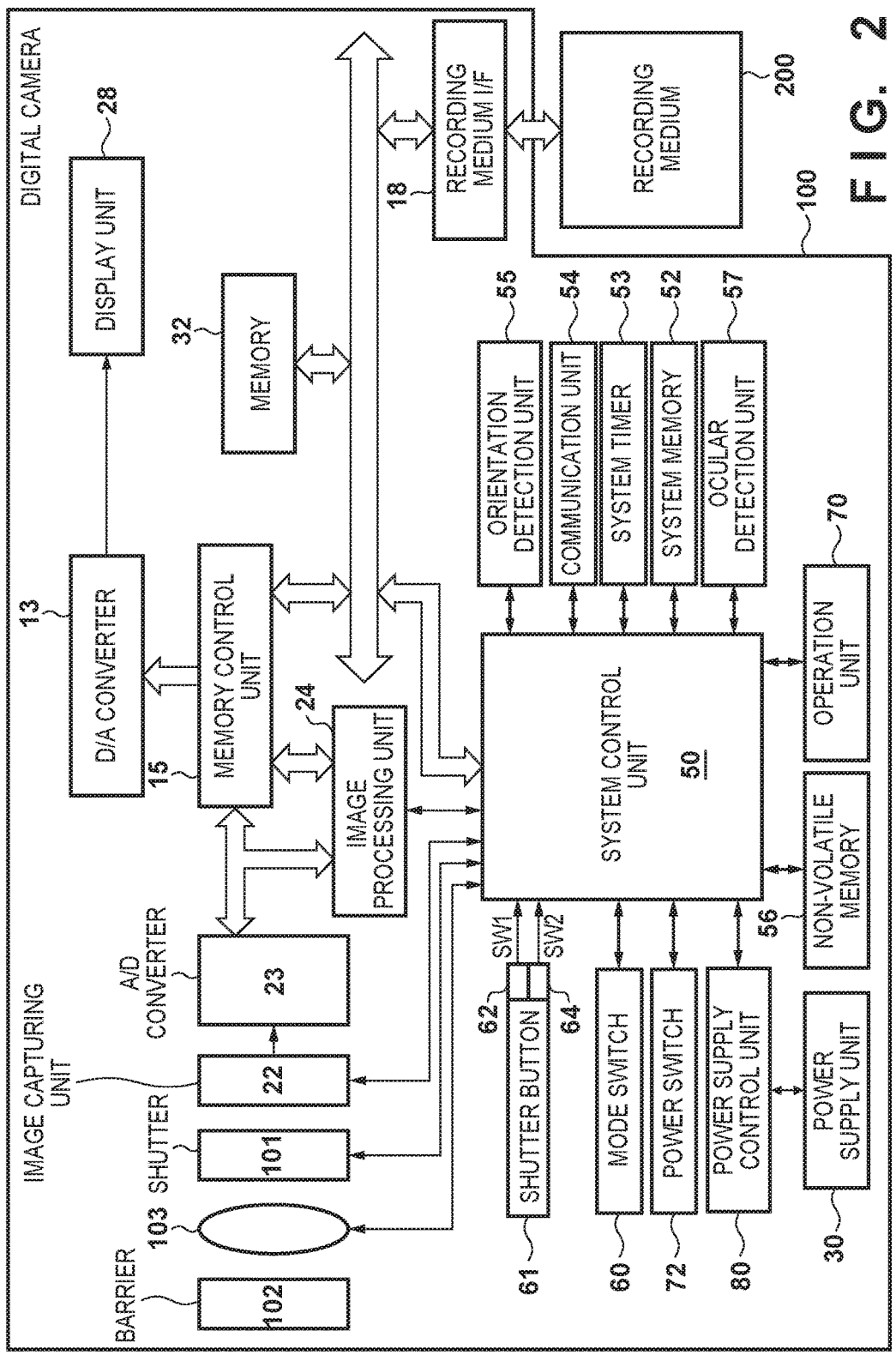
FIG. 2 is a block diagram showing an example of a configuration of the digital camera 100.
Figure 3A:
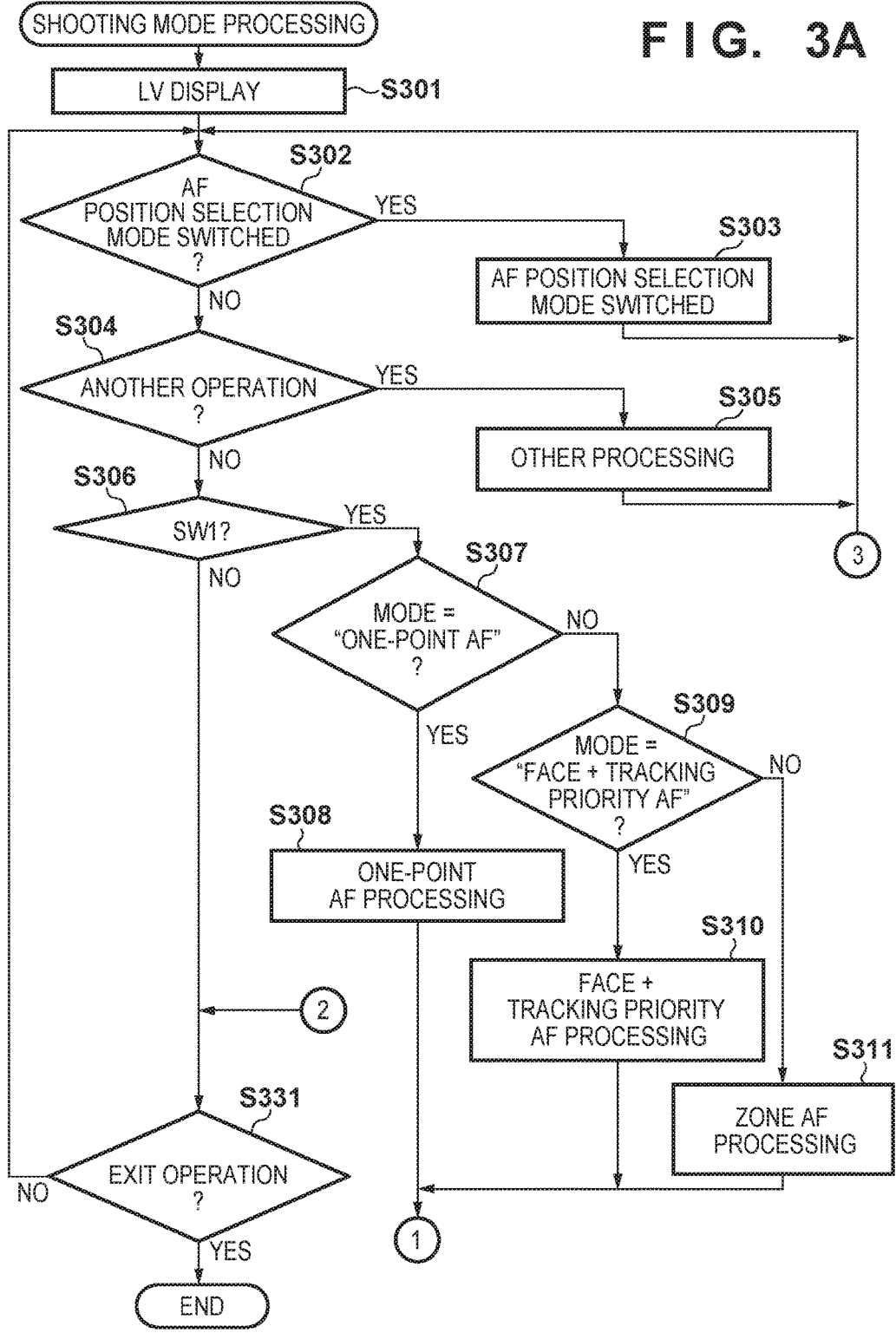
FIG. 3A is a flowchart for image shooting mode processing that is performed by the digital camera 100.
Figures 1, 3B:
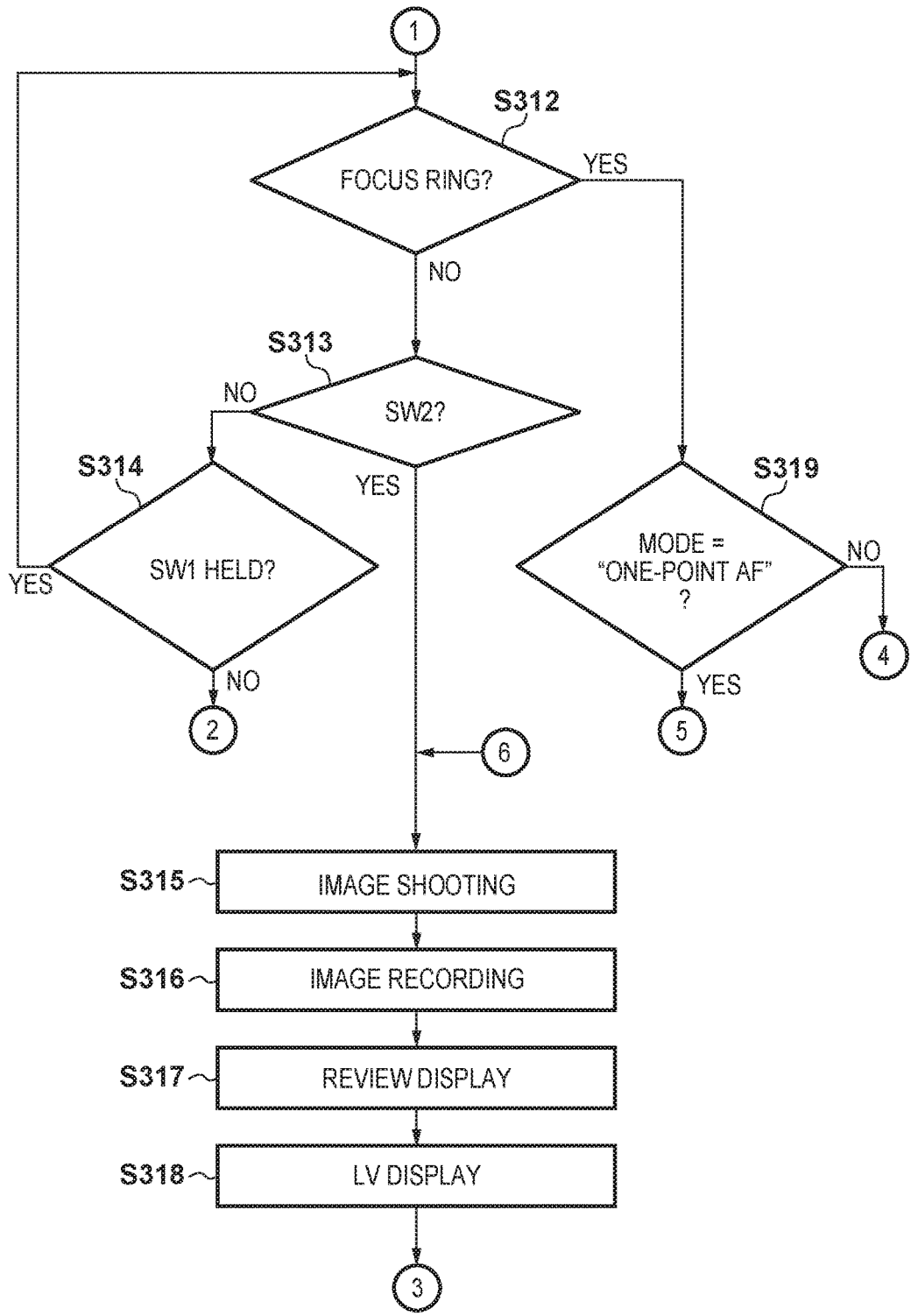
Figures 2, 3B:
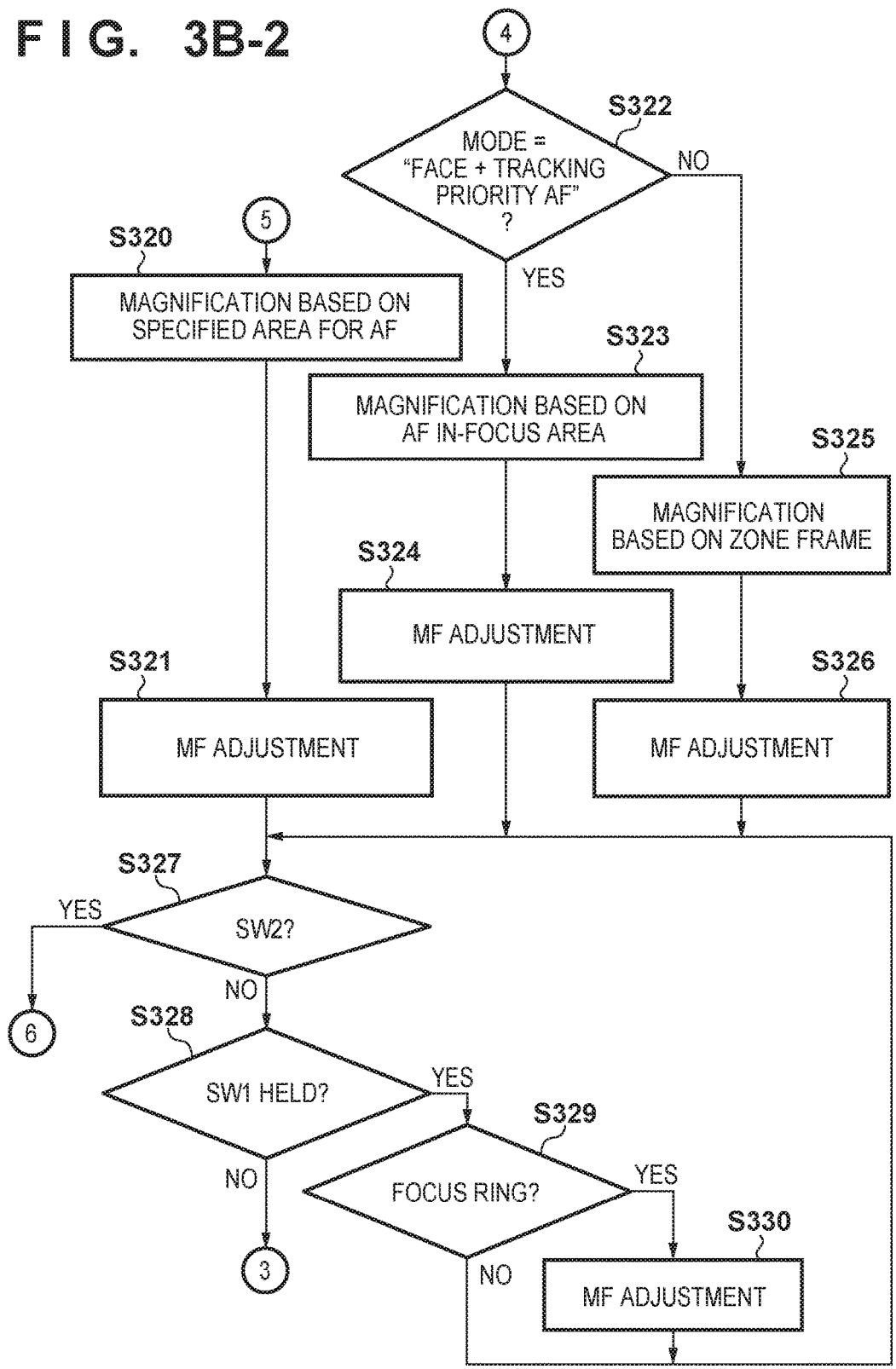

FIG. 2 is a block diagram showing an example of the configuration of the digital camera 100. In FIG. 2, an image capturing lens 103 represents a group of lenses that include a zoom lens and a focus lens. A shutter 101 is a shutter that is provided with a diaphragm function. An image capturing unit 22 is an image sensor that is constituted by, for example, a CCD or CMOS sensor, which converts an optical image into electrical signals. An A/D converter 23 converts analogue signals to digital signals. The A/D converter 23 is used to convert analogue signals output from the image capturing unit 22, to digital signals. A barrier 102 covers an image capturing system, which includes the image capturing lens 103, of the digital camera 100, to prevent the image capturing system, which includes the image capturing lens 103, the shutter 101, and the image capturing unit 22, from becoming dirty or being damaged.

An image processing unit 24 performs predetermined pixel interpolation, resize processing such as size reduction, and color conversion processing, on data from the A/D converter 23 or data from a memory control unit 15. The image processing unit 24 also performs predetermined computation processing using captured image data, and a system control unit 50 performs exposure control and ranging control based on the result of computation thus obtained. Thus, TTL (through-the-lens) type AF (autofocus) processing, AE (automatic exposure) processing, and EF (flash preliminary emission) processing are performed. Furthermore, the image processing unit 24 performs predetermined computation processing using captured image data, and TTL type AWB (automatic white balance) processing is also performed based on the result of computation thus obtained.

Output data from the A/D converter 23 is written into a memory 32 via the image processing unit 24 and the memory control unit 15, or directly via the memory control unit 15. The memory 32 stores image data that has been acquired by the image capturing unit 22 and converted to digital data by the A/D converter 23, and image data that is to be displayed on the display unit 28. The memory 32 has a storage capacity that is sufficient to store a predetermined number of still images and a predetermined length of moving images and audio.

The memory 32 also serves as a memory for image display (a video memory). A D/A converter 13 converts image display data that is stored in the memory 32 to analogue signals, and supplies the display unit 28 with the analogue signals. The image data to be displayed, thus written into the memory 32, is displayed by the display unit 28 via the D/A converter 13. The display unit 28 performs display on a display such as an LCD, based on the analogue signals from the D/A converter 13. Digital signals that have been subjected to AD conversion performed by the A/D converter 23 and that have been accumulated in the memory 32 are subjected to analogue conversion that is performed by the D/A converter 13, and are sequentially transferred to the display unit 28 and are displayed. Thus, through-the-lens image display (live-view display) can be performed.

A non-volatile memory 56 is a memory that is a recording medium that can be electrically erased and recorded to, and an EEPROM or the like is used, for example. The non-volatile memory 56 stores constants, programs, and so on, which are used by the system control unit 50 to operate. The programs mentioned here are computer programs that are used for execution of various flowcharts, which will be described in detail later in the present embodiment.

The system control unit 50 controls the digital camera 100 overall. The system control unit 50 executes the above-described programs stored in the non-volatile memory 56 to realize each kind of processing according to the present embodiment, which will be described later. A system memory 52 is realized using a RAM. Constants, variables, programs that have been read out of the non-volatile memory 56, and so on, which are to be used by the system control unit 50 to operate, are loaded to the system memory 52. The system control unit 50 also controls the memory 32, the D/A converter 13, the display unit 28, and so on to perform display control. A system timer 53 is a timer unit that measures time that is used for various kinds of control, and time indicated by an internal clock.

The mode change switch 60, the shutter button 61, and the operation unit 70 are operation units that are used to input various operational instructions to the system control unit 50. The mode change switch 60 switches the operation mode of the system control unit 50 to a still image recording mode, a moving image recording mode, or a playback mode, for example. There are a plurality of still image recording modes, which include an automatic image shooting mode, an automatic scene recognition mode, a manual mode, various scene modes, which are settings for shooting images in different scenes, a program AE mode, a custom mode, and so on. Using the mode change switch 60, it is possible to directly switch to one of these modes. Alternatively, it may be possible to open a menu screen by pressing a menu button that is included in the operation unit 70, and to switch to one of the modes included in the menu screen, using another operation member. Similarly, there may be a plurality of moving image recording modes.

A first shutter switch 62 is turned ON halfway through operation of the shutter button 61 that is provided on the digital camera 100, in response to a so-called half-press (a shooting preparation instruction), and generates a first shutter switch signal SW1. In response to the first shutter switch signal SW1, the system control unit 50 starts operating to perform AF (autofocus) processing. AE (automatic exposure) processing, AWB (automatic white balance) processing, EF (flash preliminary emission) processing, or the like.

A second shutter switch 64 is turned ON upon completion of the operation with the shutter button 61, in response to a so-called full-press (a shooting instruction), and generates a second shutter switch signal SW2. In response to the second shutter switch signal SW2, the system control unit 50 starts operating to perform a series of image shooting processing, from reading out of signals from the image capturing unit 22 to writing of image data into the recording medium 200.

The operation members included in the operation unit 70 are each assigned an appropriate function for each scene upon various functional icons that are displayed on the display unit 28 being selected and operated, for example, and serve as various functional buttons. Examples of the functional buttons include an exit button, a return button, a next-image button, a jump button, a narrowing-down button, an attribute change button, and so on. Upon the menu button included in the operation unit 70 being pressed, a menu screen on which various kinds of settings can be made is displayed on the display unit 28. The user can intuitively make various kinds of settings, using the menu screen displayed on the display unit 28, four-direction buttons, namely, up, down, left, and right buttons, a SET button, and so on.

The controller wheel 73 (see FIG. 1) is an operation member that is included in the operation unit 70 and accepts a rotational operation, and is used together with the direction buttons when, for example, a user inputs an instruction to select an item. Upon a user performing a rotational operation with the controller wheel 73, an electrical pulse signal corresponding to the amount by which the controller wheel 73 has been operated is generated, and the system control unit 50 controls the units of the digital camera 100 based on this pulse signal. Using this pulse signal, the system control unit 50 can determine the angle of the rotational operation that has been performed with the controller wheel 73, the number of times the controller wheel 73 has been rotated, and so on. Note that the controller wheel 73 may be any operation member as long as it can detect a rotational operation. For example, the controller wheel 73 may be a dial operation member that is rotated by a user performing a rotational operation, and generates a pulse signal. Alternatively, the controller wheel 73 may be an operation member that is constituted by a touch sensor, which is not rotatable but detects a rotational movement of a user's finger on the controller wheel 73, for example (a so-called touch wheel).

A power supply control unit 80 is constituted by a battery detection circuit, a DC-DC converter, a switching circuit that performs switching from a block to another that is to be energized, and so on, and detects whether or not a battery is attached, the type of battery, and the remaining battery capacity. The power supply control unit 80 also controls the DC-DC converter based on the results of detection and an instruction from the system control unit 50, and supplies the required voltage to the units, including the recording medium 200, for the required period of time.

A power supply unit 30 is constituted by a primary battery such as an alkaline battery or a lithium battery, or a secondary battery such as a NiCd battery, a NiMH battery, or a Li battery, and an AC adapter, for example. A recording medium I/F 18 is an interface with the recording medium 200 such as a memory card or a hard disk. The recording medium 200 is a recording medium for recording captured images, such as a memory card, and is constituted by a semiconductor memory, an optical disc, a magnetic disk, or the like.

A communication unit 54 is connected to an external apparatus through wireless communication or via a cable, and transmits and receives video signals, audio signals, and so on. The communication unit 54 can also be connected to a wireless LAN (Local Area Network) and the Internet. The communication unit 54 can transmit images captured by the image capturing unit 22 (including live-view images) and images recorded on the recording medium 200, and can receive image data and various kinds of other pieces of information from an external apparatus.

An attitude detection unit 55 detects the attitude of the digital camera 100 relative to the direction of gravity. Based on the attitude detected by the attitude detection unit 55, an image captured by the image capturing unit 22 can be determined as being an image captured when the digital camera 100 was held in a horizontal orientation, or an image captured when the digital camera 100 was held in a vertical orientation. The system control unit 50 can add orientation information that corresponds to the attitude detected by the attitude detection unit 55, to the image file of an image captured by the image capturing unit 22, and rotate and record an image according to the attitude. An acceleration sensor, a gyro sensor, or the like can be used as the attitude detection unit 55.

An ocular detection unit 57 detects the approach of an eye (an object). The system control unit 50 performs switching to display/not display of an image on the rear display panel or the electronic viewfinder included in the display unit 28, based on the state that has been detected by the ocular detection unit 57.

FIGS. 3A, 3B-1, and 3B-2 are flowcharts for image shooting mode processing that is performed by the digital camera 100. Each processing step in these flowcharts is realized by the system control unit 50 loading a program stored in the non-volatile memory 56 to the system memory 52 and executing the program. Upon the power switch 72 being operated and accordingly the power supply being turned ON, the system control unit 50 initializes flags, control variables, and so on, and then starts image shooting mode processing.

In step S301, the system control unit 50 starts live-view display (LV display) on the display unit 28.

In step S302, the system control unit 50 determines whether or not an AF position selection mode switching operation has been performed on the operation unit 70. If an AF position selection mode switching operation has been performed, processing proceeds to step S303. Otherwise, processing proceeds to step S304.

In step S303, the system control unit 50 performs AF position selection mode switching (mode setting). An AF position selection mode is a setting value related to AF control that is performed by the system control unit 50. Within the captured area, an area that is to be subjected to AF control (the AF target area) is changed according to the setting value. In the description of the present embodiment, it is assumed that switching between three AF position selection modes, namely "one-point AF mode", "face+tracking priority AF mode", and "zone AF mode", can be performed.

The one-point AF mode is a mode in which the digital camera 100 performs AF control on only one area that has been specified in advance, treating the area as the AF target area, within an area on which the digital camera 100 can perform AF control (an area that can be regarded as an in-focus target in the captured area, and that may be the entirety of the captured area, for example. Hereinafter, this area is referred to as "AF feasible area"). The face+tracking priority AF mode is a mode in which the digital camera 100 performs AF control on the entirety of the AF feasible area, treating the area as the AF target area. The zone AF mode is a mode in which the user sets a zone frame at any position in the AF feasible area, and the digital camera 100 performs AF control on an area within the zone frame, treating the area as the AF target area.

In step S304, the system control unit 50 determines whether or not an operation other than an AF position selection mode switching operation, an SW1 operation (described later) using the shutter button 61, or an exit operation (described later) has been performed on the operation unit 70. Examples of the aforementioned determination-target operation include an operation that is performed to move an AF target area or a zone frame in the captured area in cases where the one-point AF mode or the zone AF mode above has been set. If such an operation has been performed, processing proceeds to step S305. Otherwise, processing proceeds to step S306.

In step S305, the system control unit 50 performs other processing (processing corresponding to the operation performed in step S304). For example, if an operation is performed to move a zone frame, the system control unit 50 moves the zone frame.

In step S306, the system control unit 50 determines whether or not an SW1 operation using the shutter button 61 has been performed. If an SW1 operation has been performed, processing proceeds to step S307. Otherwise, processing proceeds to step S331.

In step S307, the system control unit 50 determines whether or not the AF position selection mode is the one-point AF mode. If the mode is the one-point AF mode, processing proceeds to step S308. Otherwise, processing proceeds to step S309.

Figure 4A:
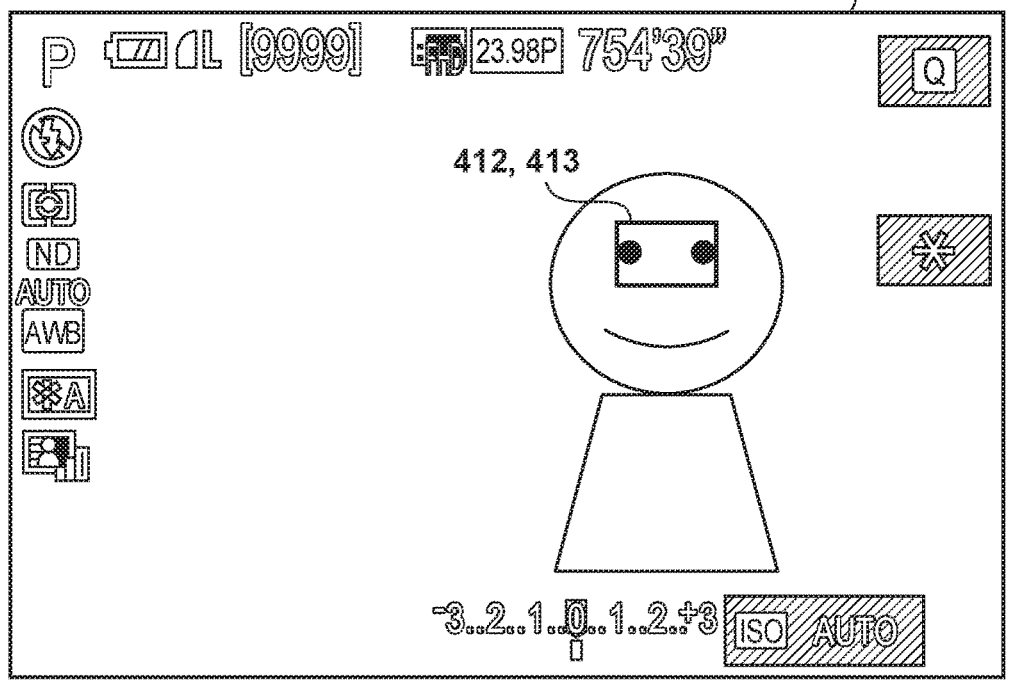
FIGS. 4A to 4F are diagrams showing examples of views of LV images corresponding to AF position selection modes.

In step S308, the system control unit 50 performs AF control on an area that has been specified in advance within the captured area, treating the area as the AF target area. FIG. 4A is an example of when the one-point AF mode is performed. The system control unit 50 performs AF control on a specified area 412 within an LV image 411 corresponding to the captured area, treating the area as the AF target area. In the one-point AF mode, an in-focus area 413 is the same area as the specified area 412. Note that the specified area 412 may be moved in step S305, as described above.

In step S309, the system control unit 50 determines whether or not the AF position selection mode is the face+tracking priority AF mode. If the mode is the face+tracking priority AF mode, processing proceeds to step S310. Otherwise, processing proceeds to step S311.

Figure 4B:
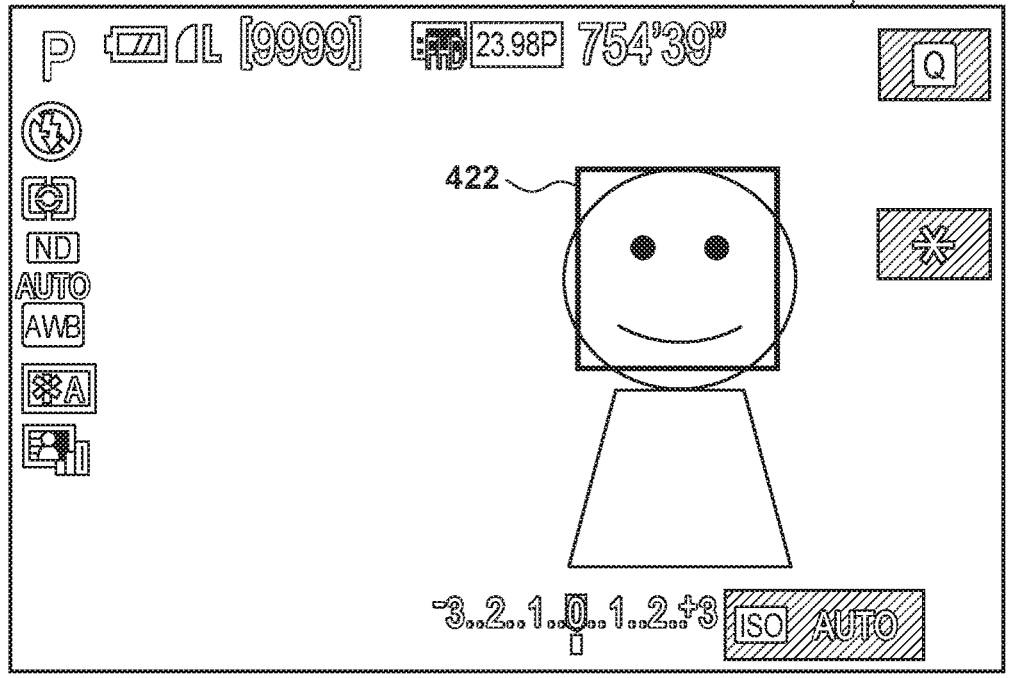

In step S310, the system control unit 50 performs AF control on the entirety of the AF feasible area, treating the area as the AF target area. FIG. 4B is an example of when the face+tracking priority AF mode is performed. The system control unit 50 detects a face in the LV image 421, and performs AF control such that the face area will be in focus. As shown in FIG. 4B, the system control unit 50 displays an in-focus area 422 corresponding to the face area. If a face cannot be detected, the system control unit 50 automatically determines an in-focus area (the AF target area that is to be in focus) within the entirety of the AF feasible area, based on a predetermined algorithm. For example, the system control unit 50 automatically determines a subject that is to be in focus by assigning predetermined weights to various conditions such that a face that has been detected, a subject that is close to the camera (close to the closest focal point), a high-contrast subject, a subject that is close to the center of the captured area, or the like is given priority.

Figure 4C:
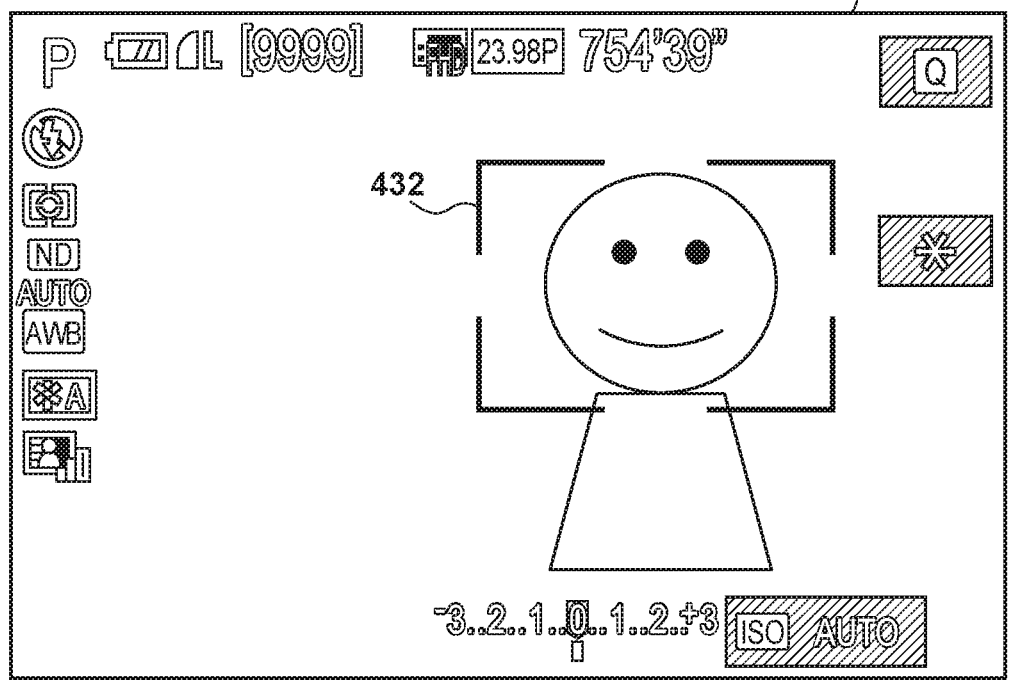
Figure 4D:
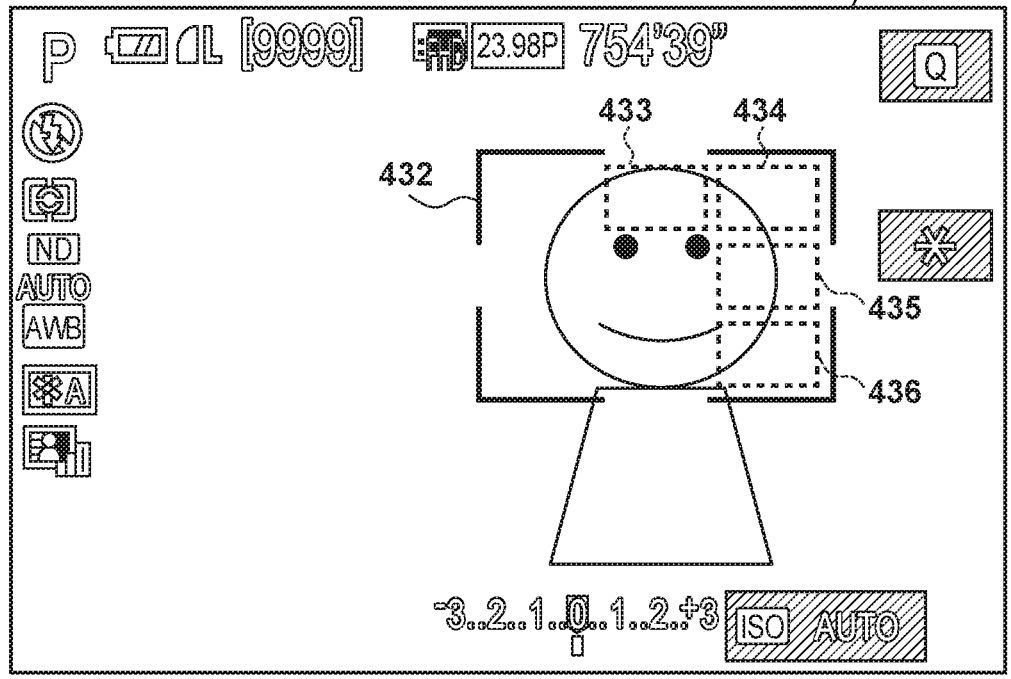

In step S311, the system control unit 50 performs AF control on an area within the zone frame, treating the area as the AF target area. FIGS. 4C and 4D are examples of when the zone AF mode is performed. As shown in FIG. 4C, upon the AF position selection mode being switched to the zone AF mode in step S303, a zone frame 432 is superimposed on an LV image 431. As described above, the zone frame 432 may be moved in step S305. The system control unit 50 performs AF control within the zone frame 432, and upon one or more areas in the zone frame 432 being brought into focus successfully, the system control unit 50 displays an in-focus area(s) corresponding thereto. In the example in FIG. 4D, four in-focus areas 433, 434, 435, and 436 are displayed within the zone frame 432. Note that, in the zone AF mode, a subject that is to be in focus is automatically determined within the zone frame 432. This method for determining an in-focus area is the same as that in the face+tracking priority AF mode except that the target area is not the entirety of the AF feasible area, but an area within the zone frame. Note that the algorithm may be slightly changed from that for the face+tracking priority AF mode, such as by assigning a higher priority to a moving subject (a moving object). The zone AF mode can be desirably used when, for example, the position, in the composition, of a main subject that is in focus has been roughly determined (a zone frame can be set at the position), and a moving subject (a moving object) or the like for which it is difficult to determine a precise AF position in advance is the subject of a photograph. For example, it is possible to desirably use the zone AF mode to take a photograph of a train, an airplane, a child, an athlete, an animal, or the like. Also, in the case of a stationary subject, it is preferable that the zone AF mode is used when not one point but the entirety of a subject that occupies a large area relative to the area within the composition is desired to be in focus.

In step S312, the system control unit 50 determines whether or not a focus ring for an MF operation, which is included in the operation unit 70, has been operated. If the focus ring has been operated, processing proceeds to step S319. Otherwise, processing proceeds to step S313.

In step S313, the system control unit 50 determines whether or not an SW2 operation using the shutter button 61 has been performed. If an SW2 operation has been performed, processing proceeds to step S315. Otherwise, processing proceeds to step S314.

In step S314, the system control unit 50 determines whether or not SW1 is held in an ON state. If SW1 is held in an ON state, processing proceeds to step S312. Otherwise, processing proceeds to step S331.

In step S315, the system control unit 50 performs image shooting. That is, the system control unit 50 performs ultimate image shooting in which exposure is performed under shooting conditions that have been set, which are different from those for live-view image capturing. In step S316, the system control unit 50 records the captured image on the recording medium 200 as an image file. In step S317, the system control unit 50 displays the captured image for review on the display unit 28. In step S318, the system control unit 50 re-starts LV display on the display unit 28.

In step S319, the system control unit 50 determines whether or not the AF position selection mode is the one-point AF mode. If the mode is the one-point AF mode, processing proceeds to step S320. Otherwise, processing proceeds to step S322.

Figure 5A:
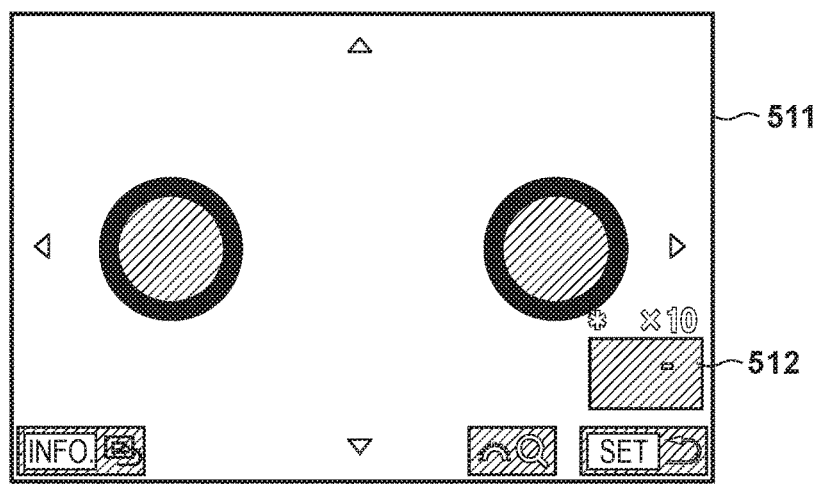
FIGS. 5A to 5C are diagrams showing examples of magnified views of LV images corresponding to AF position selection modes.

In step S320, the system control unit 50 magnifies the LV image with reference to a specified area for AF (the AF target area). FIG. 5A is an example of magnification processing performed in the one-point AF mode. If magnification processing is performed in a state where the view shown in FIG. 4A is displayed, the state changes to that shown in FIG. 5A. An LV image 511 shows a magnified view of an area that is in or near the specified area 412 in FIG. 4A. A magnification indicator 512 indicates the magnified position within the LV image 411 in FIG. 4A (i.e. the area occupied by the magnified LV image 511, relative to the entirety of the captured area).

In step S321, the system control unit 50 performs focus adjustment according to the amount by which the focus ring has been operated.

In step S322, the system control unit 50 determines whether or not the AF position selection mode is the face+tracking priority AF mode. If the mode is the face+tracking priority AF mode, processing proceeds to step S323. Otherwise, processing proceeds to step S325.

Figure 5B:
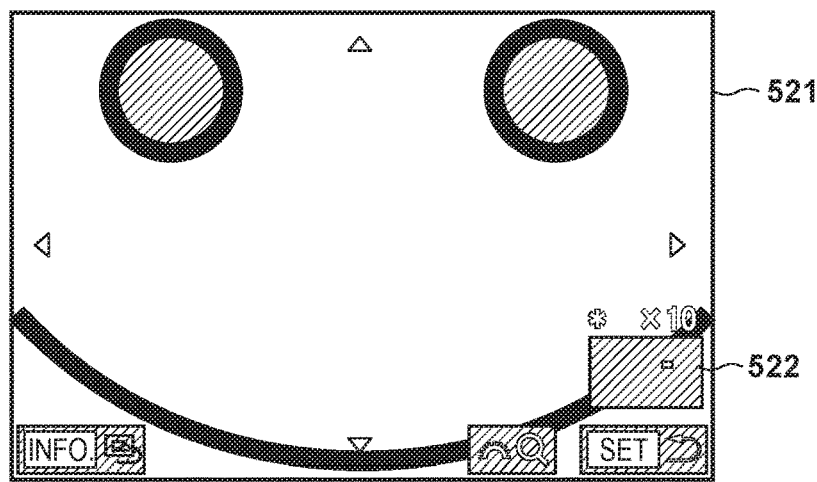

In step S323, the system control unit 50 magnifies the LV image with reference to the AF in-focus area. FIG. 5B is an example of magnification processing performed in the face+tracking priority AF mode. If magnification processing is performed in a state where the view shown in FIG. 4B is displayed, the state changes to that shown in FIG. 5B. An LV image 521 shows a magnified view of an area that is in or near the in-focus area 422 in FIG. 4B. A magnification indicator 522 indicates the magnified position within the LV image 421 in FIG. 4B (i.e. the area occupied by the magnified LV image 521, relative to the entirety of the captured area).

In step S324, the system control unit 50 performs focus adjustment according to the amount by which the focus ring has been operated.

Figure 5C:
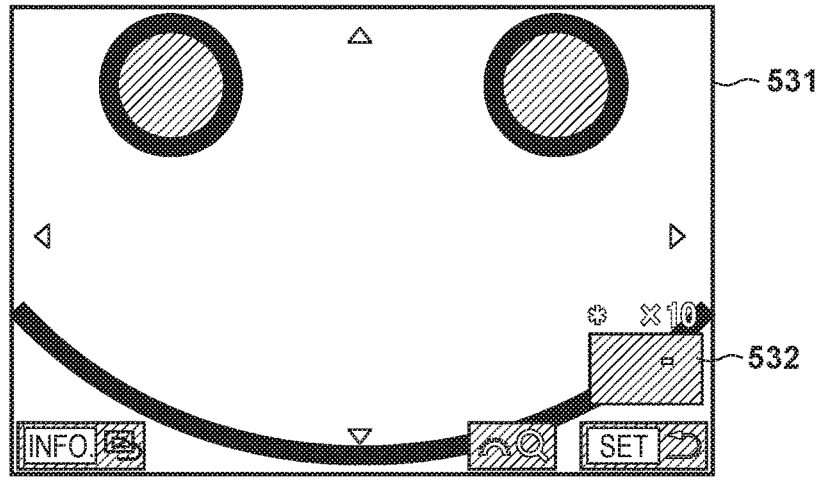

In step S325, the system control unit 50 magnifies the LV image with reference to a central coordinate point of (a predetermined position in) the zone frame. FIG. 5C is an example of magnification processing performed in the zone AF mode. If magnification processing is performed in a state where the view shown in FIG. 4D is displayed, the state changes to that shown in FIG. 5C. An LV image 531 shows a magnified view of an area that is in the vicinity of the central coordinate point of the zone frame 432 in FIG. 4D. A magnification indicator 532 indicates the magnified position within the LV image 431 in FIG. 4D (i.e. the area occupied by the magnified LV image 531, relative to the entirety of the captured area). In FIG. 4D, the in-focus areas 433, 434, 435, and 436 are present at a peripheral area of the face, and no in-focus area is present at the center point of the face. Therefore, if the position to be magnified is determined based on the in-focus areas as in the case of step S323 (the case of the face+tracking priority AF mode), there is the possibility of the center point of the face that the user wishes to bring into focus being not displayed. In contrast, according to the present embodiment, in the zone AF mode, the position to be magnified is determined based on the central coordinate point of the zone frame. Therefore, there is an increased likelihood that a subject that meets the user's intention will be displayed in a magnified view. Note that the position to be magnified is not necessarily determined with reference to the central coordinate point, and may be determined with reference to the upper left coordinate point of the zone frame.

In step S326, the system control unit 50 performs focus adjustment according to the amount by which the focus ring has been operated.

In step S327, the system control unit 50 determines whether or not an SW2 operation using the shutter button 61 has been performed. If an SW2 operation has been performed, processing proceeds to step S315. Otherwise, processing proceeds to step S328.

In step S328, the system control unit 50 determines whether or not SW1 is held in an ON state. If SW1 is held in an ON state, processing proceeds to step S329. Otherwise, processing proceeds to step S331.

In step S329, the system control unit 50 determines whether or not the focus ring has been operated. If the focus ring has been operated, processing proceeds to step S330. Otherwise, processing proceeds to step S327.

In step S330, the system control unit 50 performs focus adjustment according to the amount by which the focus ring has been operated.

In step S331, the system control unit 50 determines whether or not an exit operation (e.g. an instruction to switch to the playback mode, or a power OFF operation) has been performed on the operation unit 70. If an exit operation has been performed, processing represented by the present flowcharts ends. If an exit operation has not been performed, processing proceeds to step S302.

Note that the present embodiment describes a case in which LV image magnification processing is performed if the focus ring has been operated (i.e. a manual focus operation has been performed) in step S312. However, an operation that triggers LV image magnification processing is not limited to a manual focus operation, and the digital camera 100 may be configured such that processing proceeds from step S312 to S319 upon a specific operation being performed. Also, the digital camera 100 may be configured to perform LV image magnification processing without a specific operation being performed. For example, the system control unit 50 may omit the determination in step S312, and allow processing to proceed to step S319 after determining an in-focus area in step S308, S310, or S311.

Also, although the present invention embodiment describes a configuration for performing LV image magnification with reference to the central coordinate point of the zone frame if the AF position selection mode is the zone AF mode, LV image magnification may be performed with reference to another position depending on the situation. For example, if the zone AF mode has been set, the system control unit 50 detects a specific subject (a face, an eye, a specific object, etc.) in the LV image. If the specific subject is detected within the zone frame, the system control unit 50 determines an in-focus area with reference to an area occupied by the specific subject. In this case, the system control unit 50 may magnify the LV image with reference to the in-focus area. Furthermore, for example, if a plurality of in-focus areas have been determined in the zone AF mode, and each of the plurality of in-focus areas is adjacent to at least one in-focus area, the system control unit 50 may magnify the LV image with reference to the plurality of in-focus areas. For example, the system control unit 50 may magnify the LV image with reference to the center point or the center of gravity of the plurality of in-focus areas. Conversely, if the plurality of in-focus areas include an in-focus area that is not adjacent to any other in-focus area, the system control unit 50 may magnify the LV image with reference to a predetermined position in the zone frame (such as the center thereof) regardless of the plurality of in-focus areas.

Also, for example, if an AF position selection mode in which a zone frame that is larger than that in the zone AF mode (hereinafter, "the large zone AF mode") can be set is set, the system control unit 50 may magnify the LV image with reference to an in-focus area. In the large zone AF mode, there is the possibility of a zone frame being set such that a plurality of subjects are included in the zone frame. Therefore, it is possible to increase the likelihood that the magnified position will meet the user's intention by magnifying the LV image with reference to an in-focus area as in the face+tracking priority AF mode.

Also, for example, the digital camera 100 may be configured to allow a user to set a magnification ratio regarding magnification of the LV image. In a case where the magnification ratio is relatively small, there is the possibility of an area at or near the center of the zone frame being displayed in a magnified view, even if the LV image is magnified with reference to an in-focus area. Therefore, in the zone AF mode, the system control unit 50 magnifies the LV image with reference to the center of the zone frame if the magnification ratio that has been set is a first magnification ratio (e.g. ×10), and magnifies the LV image with reference to the in-focus area if the magnification ratio that has been set is a second magnification ratio that is smaller than the first magnification ration (e.g. ×5).

Figure 4E:
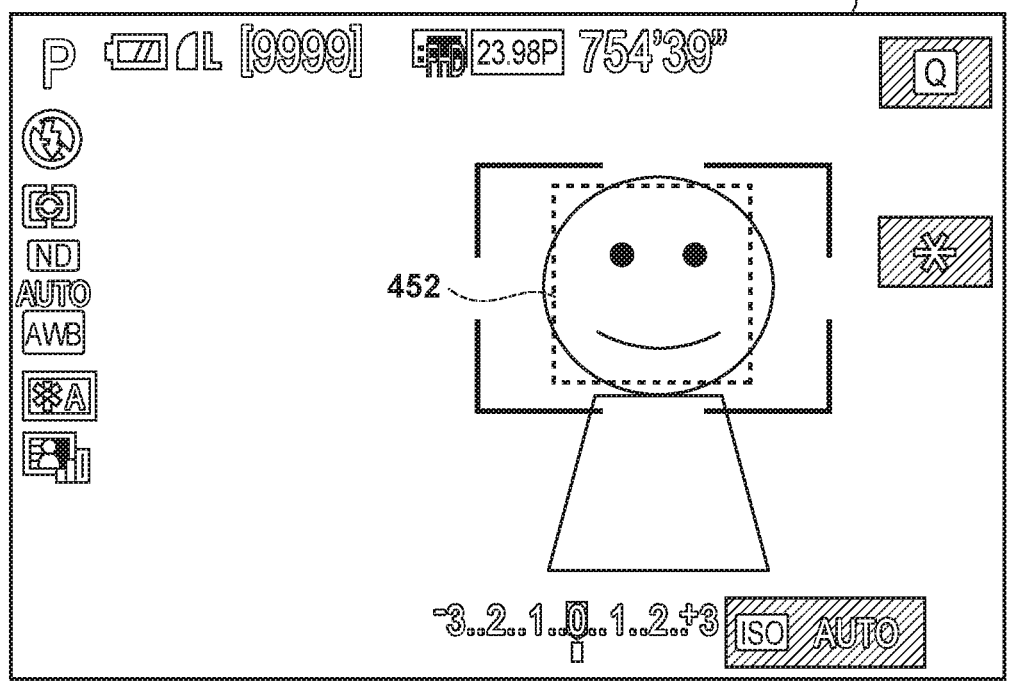
Figure 4F:
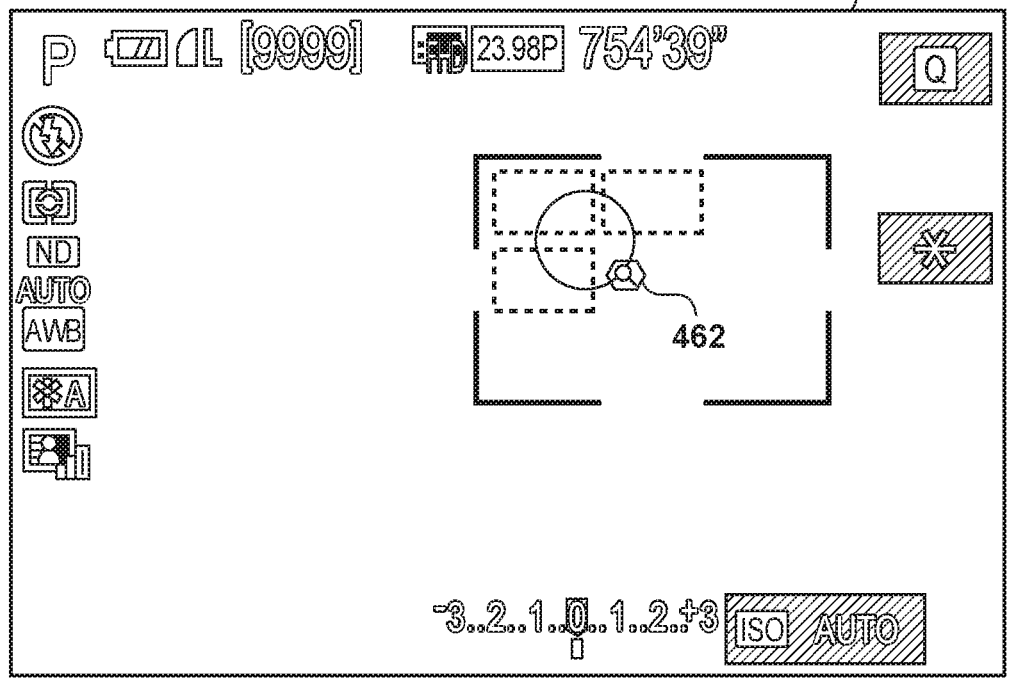

Also, since the position to be magnified dynamically changes in the present embodiment, the user may be provided in advance (before the LV image is magnified) with information indicating the position to be magnified. For example, in a case where an in-focus area has been determined with reference to an area occupied by a specific subject detected from the zone frame in the zone AF mode, the system control unit 50 superimposes an in-focus frame 452 on an LV image 451 as shown in FIG. 4E. As a result, the user can recognize that the LV image will be magnified with reference to the in-focus area corresponding to an area occupied by the detected subject. Alternatively, as shown in FIG. 4F, the system control unit 50 may superimpose a magnification position mark 462 on an LV image 461 (in order to improve visibility, the subject is omitted from FIG. 4F). Note that in a case of magnifying the LV image with reference to the center of the zone frame, the system control unit 50 may hide the magnification position mark 462.

Also, although the present embodiment describes magnified views of an LV image displayed in the image shooting mode, the system control unit 50 may display a magnified view of a captured image in the playback mode for playing back the captured image. The system control unit 50 switches to the playback mode in response to a playback instruction, and performs control to magnify a captured image in response to a magnification instruction that is provided after the captured image has been displayed. In the playback mode, the system control unit 50 may magnify a captured image with reference to an in-focus area determined when the captured image was captured, regardless of in which AF position selection mode, out of the face+tracking priority AF mode and the zone AF mode, the image was captured. As a result, when playing back an image, the user can discern the best in-focus position in a magnified view. It is preferable that such magnification in the playback mode is realized by using a focus check screen for performing checking regarding focusing, instead of by performing a normal magnification operation. In cases where a focus check screen is not used, magnification is realized in a different manner depending on the type of magnification operation, i.e. if magnification is realized by performing a pinch operation on a touch panel, an image is magnified with reference to the center point of the pinch operation, and if magnification is realized by performing another magnification operation, an image is magnified with reference to the center point of the displayed area. Note that when recording a captured image, the system control unit 50 records the captured image in association with information that indicates an AF position selection mode and an in-focus area.

As described above, according to the first embodiment, the digital camera 100 sets one of a plurality of AF position selection modes, and determines an in-focus area by performing AF control on an area that is included in the captured area and corresponds to the AF position selection mode thus set. The plurality of AF position selection modes include a first autofocus mode (an AF mode) (e.g. the face+tracking priority AF mode) in which the in-focus area is automatically determined within a first area (e.g. the entirety of the AF feasible area) in the captured area. The plurality of AF position selection modes also include a second AF mode (e.g. the zone AF mode) in which the in-focus area is automatically determined within a second area that is smaller than the first area. The digital camera 100 displays a magnified view of an LV image in response to a specific operation (e.g. a manual focus operation) being performed after the in-focus area has been determined. If the first AF mode has been set, the digital camera 100 magnifies the LV image with reference to the in-focus area, and if the second AF mode has been set, the digital camera 100 magnifies the LV image with reference to a predetermination position in the second area (e.g. a zone frame) regardless of the in-focus area. As a result, it is possible to increase the likelihood that, in a case where an LV image is magnified after an in-focus area has been determined through AF control, the magnified position will meet the user's intention.

Note that the various kinds of control described above as being performed by the system control unit 50 may be performed by one piece of hardware, or shared among a plurality of pieces of hardware so that the entire apparatus is controlled.

Although the present invention has been described based on a preferable embodiment thereof, the present invention is not limited to such a specific embodiment, and various embodiments that do not depart from the spirit of the present invention are included in the scope of the present invention. Furthermore, the above-described embodiment is merely one embodiment of the present invention, and may be combined with another embodiment as appropriate.

Also, although the embodiment above describes an example in which the present invention is applied to an image capturing control apparatus, the present invention is not limited to such an example, and the present invention is applicable to an apparatus that has the function of displaying a magnified view of an LV image. That is, the present invention is applicable to a personal computer, a PDA, a mobile phone terminal, a Portable image viewer, a printer apparatus equipped with a display, a digital photo frame, a music player, a game machine, an electronic book reader, a tablet terminal, a smartphone, a projector apparatus, a home electric appliances equipped with a display, an on-board apparatus, and so on.

Also, the present invention is applicable to not only an image capturing apparatus, but also an image capturing control apparatus that communicates with the image capturing apparatus (which may be a network camera) via a cable or through wireless communication, and remotely controls the image capturing apparatus. Examples of apparatuses that remotely control the image capturing apparatus include a smartphone, a tablet PC, a desktop PC, and so on. The image capturing control apparatus can remotely control the image capturing apparatus by providing the image capturing apparatus with commands that instruct the image capturing apparatus to perform various operations and various kinds of setting, based on operations performed on the image capturing control apparatus and processing performed by the image capturing control apparatus. Also, the image capturing control apparatus may be enabled to display a live-view image captured by the image capturing apparatus, by receiving the live-view image via a cable or through wireless communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-127829, filed Jun. 29, 2017, which is hereby incorporated by reference herein in its entirety.

What is claimed is:

1. An image capturing control apparatus comprising a memory and at least one processor which function as:
   a mode setting unit configured to set one of a plurality of autofocus modes (AF modes);
   a display control unit configured to perform control to display a live-view image (an LV image); and
   an AF control unit configured to perform AF control within an area that is included in a captured area and corresponds to the AF mode set by the mode setting unit, to perform control to determine an in-focus area,
   wherein, after the in-focus area is determined, the display control unit performs control to:
      if the AF mode set by the mode setting unit is a first AF mode in which the in-focus area is automatically determined within a first area included in the captured area, magnify the LV image with reference to the in-focus area; and
      if the AF mode set by the mode setting unit is a second AF mode in which the in-focus area is automatically determined within a second area that is smaller than the first area, magnify the LV image with reference to a predetermined position in the second area, regardless of the in-focus area.

2. The image capturing control apparatus according to claim 1,
   wherein the predetermined position is a center of the second area.

3. The image capturing control apparatus according to claim 1,
   wherein the display control unit performs control to magnify the LV image in response to a specific operation being performed after the in-focus area is determined.

4. The image capturing control apparatus according to claim 3,
   wherein the specific operation is a manual focus operation.

5. The image capturing control apparatus according to claim 1, wherein
   the processor further functions as a detection unit configured to detect a specific subject in the LV image,
   if the specific subject is not detected from the second area in the second AF mode,
      the AF control unit automatically determines the in-focus area within the second area, and
      the display control unit performs control to magnify the LV image with reference to the predetermined position in the second area, regardless of the in-focus area, and
   if the specific subject is detected from the second area in the second AF mode,
      the AF control unit performs control to determine the in-focus area with reference to an area occupied by the specific subject, and
      the display control unit performs control to magnify the LV image with reference to the in-focus area.

6. The image capturing control apparatus according to claim 1, wherein
   in a case where a plurality of in-focus areas are determined in the second AF mode,
      if the plurality of in-focus areas include an in-focus area that is not adjacent to any other in-focus area, the display control unit performs control to magnify the LV image with reference to the predetermined position in the second area, regardless of the plurality of in-focus areas, and if each of the plurality of in-focus areas is adjacent to at least one in-focus area, the display control unit performs control to magnify the LV image with reference to the plurality of in-focus areas.

7. The image capturing control apparatus according to claim 1, wherein the processor further functions as a magnification ratio setting unit configured to set a magnification ratio regarding magnification of the LV image by the display control unit, and after the in-focus area is determined, the display control unit performs control to, if the AF mode set by the mode setting unit is the second AF mode and the magnification ratio set by the magnification ratio setting unit is a first magnification ratio, magnify the LV image with reference to the predetermined position in the second area, regardless of the in-focus area, and if the AF mode set by the mode setting unit is the second AF mode and the magnification ratio set by the magnification ratio setting unit is a second magnification ratio that is smaller than the first magnification ratio, magnify the LV image with reference to the in-focus area.

8. The image capturing control apparatus according to claim 1, wherein the display control unit performs control to perform superimposed display of information indicating a position at which the LV image is magnified, on the LV image that has not been magnified.

9. The image capturing control apparatus according to claim 1, wherein, if the AF mode set by the mode setting unit is a third AF mode in which the in-focus area is automatically determined within a third area that is smaller than the first area and larger than the second area, the display control unit magnifies the LV image with reference to the in-focus area.

10. The image capturing control apparatus according to claim 1, wherein the first area is an entire area that is included in the captured area and on which the AF control unit can perform the AF control.

11. The image capturing control apparatus according to claim 1, wherein the AF control unit determines the second area according to an instruction from a user.

12. The image capturing control apparatus according to claim 1, wherein the display control unit performs control to:
  display a captured image captured in the first AF mode or the second AF mode in response to a playback instruction; and
  in response to a magnification instruction that is provided after the captured image has been displayed, magnify the captured image with reference to the in-focus area determined by the AF control unit when the captured image was captured, regardless of in which AF mode, out of the first AF mode and the second AF mode, the captured image was captured.

13. A control method executed by an image capturing control apparatus, comprising:

setting one of a plurality of autofocus modes (AF modes);

performing control to display a live-view image (an LV image);

performing AF control within an area that is included in a captured area and corresponds to the AF mode set in the setting, to perform control to determine an in-focus area; and after the in-focus area is determined, performing control to:
  if the AF mode set in the setting is a first AF mode in which the in-focus area is automatically determined within a first area included in the captured area, magnify the LV image with reference to the in-focus area; and
  if the AF mode set in the setting is a second AF mode in which the in-focus area is automatically determined within a second area that is smaller than the first area, magnify the LV image with reference to a predetermined position in the second area, regardless of the in-focus area.

14. A non-transitory computer-readable storage medium which stores a program for causing a computer to execute a control method comprising:

setting one of a plurality of autofocus modes (AF modes);

performing control to display a live-view image (an LV image);

performing AF control within an area that is included in a captured area and corresponds to the AF mode set in the setting, to perform control to determine an in-focus area; and after the in-focus area is determined, performing control to:
  if the AF mode set in the setting is a first AF mode in which the in-focus area is automatically determined within a first area included in the captured area, magnify the LV image with reference to the in-focus area; and
  if the AF mode set in the setting is a second AF mode in which the in-focus area is automatically determined within a second area that is smaller than the first area, magnify the LV image with reference to a predetermined position in the second area, regardless of the in-focus area.

* * * * *